Patented Dec. 8, 1925.

1,565,215

UNITED STATES PATENT OFFICE.

STANLEY COCHRAN SMITH, OF LONDON, ENGLAND.

TREATMENT OF ORES OR RESIDUES CONTAINING ZINC.

No Drawing.   Application filed May 14, 1924. Serial No. 713,310.

*To all whom it may concern:*

Be it known that I, STANLEY COCHRAN SMITH, a subject of the King of Great Britain, residing in London, England, have invented certain new and useful Improvements Relating to the Treatment of Ores or Residues Containing Zinc, of which the following is a specification.

In wet metallurgical processes for extracting values from ores or residues containing zinc in which hydrochloric acid or a solution of a chloride mixed or not with sulphuric acid or hydrochloric acid is the solvent used, there is obtained in the course of the process a solution of zinc chloride.

It is an object of this invention to regenerate from this solution of zinc chloride a solution of hydrochloric acid which can be returned to the process.

Another object of the invention is to obtain the zinc from the solution in the form of zinc carbonate, which is readily converted into zinc oxide, a compound of greater commercial value than zinc chloride and more readily smelted to metallic zinc.

This invention relates to a process for attaining these objects and takes advantage of the fact that when a solution of zinc chloride is heated with barium carbonate, barium chloride passes into solution and zinc carbonate is precipitated, as may be expressed by the equation—

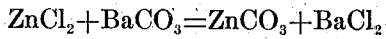

The solution of barium chloride is readily converted into hydrochloric acid solution, with precipitation of barium sulphate, by addition of sulphuric acid, as may be expressed by the equation—

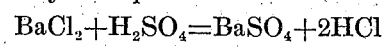

The barium sulphate may be converted into barium carbonate by a well-known process.

It is frequently desirable that the sulphate-ion should be removed from the liquor which is to be used again, after being revivified, for leaching more ore or the like. The invention presents the advantage that a single reagent, barium carbonate, will serve for removing both zinc-ions and sulphate-ions from the liquor. For (after the first operation) the liquor or a part of it from which the zinc carbonate has been precipitated and which therefore contains barium chloride, may be added to the liquor which has been used for leaching the ore, to precipitate sulphate-ions before barium carbonate is introduced.

The invention is particularly applicable to processes in which ores, concentrates or the like containing the sulphides of lead and zinc are treated with hydrochloric acid or an equivalent solvent (such as a solution of sodium chloride, or other suitable chloride, containing hydrochloric acid or sulphuric acid) by which the lead is extracted to be then recovered from the leaching liquor in the form of lead chloride. It is frequently important that after separation of the lead chloride the liquor should be used again and that it should be possible to repeat this re-use many times. Obviously, any chloride used in leaching the ore should be one that is not decomposed by barium carbonate.

It is found, however, that other constituents of the ore are also extracted to some extent by the leaching liquor, which soon becomes unfit for re-use. In particular the chlorides of iron and zinc are apt to accumulate in the liquor and of these the zinc chloride is especially objectionable since the solubility of lead chloride in the liquor is diminished if the latter contains much zinc chloride.

One mode of operating involves the separation of iron in the form of oxide before the liquor is treated with barium carbonate, in order that the zinc carbonate may be as pure as is practicable.

It will be understood that if I desire to prepare a very pure zinc carbonate I must remove from the solution before treatment in the barium carbonate any impurities contained in the solution which would be precipitated by barium carbonate.

The complete process may be as follows:—

It is advantageous, for the purpose of economizing the use of reagents, to remove or neutrailze any free hydrochloric acid present in the liquor. For this purpose the liquor may be distilled or otherwise concentrated to expel, and, if desired, to recover the hydrochloric acid evolved and the residual acid (or all the acid if the liquor has not been concentrated) neutralized, preferably by adding some of the ore, roasted or not, which is under treatment.

Any lead present in the neutral liquor may now be precipitated by adding metallic zinc.

Boiling with some form of zinc oxide preferably free from lead now follows in order to precipitate iron, which if not already in the ferric state should be brought into that state by means of a suitable oxidizing agent. A large part of any manganese present will be removed with the iron. Any lead now found in solution may be removed by treatment with metallic zinc.

The liquor thus far obtained may be contaminated with sulphates; these may be converted into chlorides by adding barium chloride, part or the whole of which has been obtained in a previous operation.

The liquor is now ready for precipitation of zinc carbonate; for which purpose it is heated with agitation to or near to the boiling point with a quantity of barium carbonate substantially equivalent to the zinc present. The heating may continue for about 30 minutes. The best result is obtained by using freshly precipitated barium carbonate in the form of a paste.

After removal of the zinc carbonate the liquor is treated with sulphuric acid in proportion sufficient to precipitate the barium present, leaving a liquor containing free hydrochloric acid ready for re-use after having been strengthened in hydrochloric acid if necessary.

The barium sulphate may be converted into barium carbonate in known manner.

In wet processes of this kind it is seldom practicable to use virgin leaching liquor for each cycle of operations; provision must be made for removal of a portion of accumulated dissolved matter at each cycle, the purified liquor being preferably used for leaching partially leached ore.

To this end the procedure may be as follows:—

To a solution of brine containing hydrochloric acid saturated with lead chloride at a temperature $t_1$, I add at any predetermined temperature a quantity of the ore to be treated. I agitate the mixture at a temperature $t_2$ higher than $t_1$ for a convenient period. The quantity of acid brine, saturated partially at temperature $t_2$ with lead chloride, in relation to the weight of the ore is adjusted so that it is at least sufficient to hold in solution at temperature $t_2$ the lead chloride equivalent to the lead contained in the ore. I find it convenient to employ more than this quantity. From time to time I assay the solution in order to ascertain if the bulk of the lead is in solution. I repeat this process gradually increasing the concentration of hydrochloric acid until after a convenient period the bulk of the whole of the lead is found to be in solution. I now cool the liquor to the predetermined temperature $t_1$ and separate from this liquor by filtration, settling, or other convenient manner the lead chloride which crystallizes. To this liquor I add such a quantity of hydrochloric acid as was consumed in the first operation and a fresh portion of ore and agitate the mixture at the temperature $t_2$ until the whole or the bulk of the lead contained in the ore is dissolved; the cycle of operations is repeated until it is found owing to the accumulation of the chlorides of zinc and/or iron which also may pass into soution that the bulk or the whole of the lead is no longer dissolved from the ore, I then remove such a quantity of liquor as contains as much zinc and/or iron as was extracted from the ore in a previous cycle of operations and treat it in the manner described above for the removal of zinc and iron. This portion of the liquor after purification and adjustment to the correct concentration of acid brine I return to the process and I may preferably utilize it first for leaching the ore previously treated with the liquors containing a certain quantity of impurities, in order that by the use of this purified liquor in the counter-current manner the lead may be the more completely dissolved from the ore.

The following example illustrates the invention:—

A lead-zinc sulphide ore from Australia containing 7.18 per cent of lead and 48.02 per cent of zinc is ground to pass through a 40 mesh standard sieve. Twenty kilos of the crushed ore are stirred in a earthenware steam-heated vessel with 200 kilos of a solution saturated with common salt and containing 3.47 per cent of Zn and 2.35 per cent of Fe and 7.5 per cent of HCl and saturated also at 60° C. with lead chloride, and the mixture is heated to the boiling point. Stirring and heating are continued until evolution of sulphuretted hydrogen has practically ceased, which will be the case in about 30 minutes. After settling, the hot brine is run into a cooling vat and cooled at 60° C., when the lead compound crystallizes. A portion of the cooled liquor containing at least as much zinc and iron as was dissolved for the ore is run off from the lead salt crystals into a still in which it is boiled down to about one-third of its bulk, the distillate collected being hydrochloric acid for re-use. The liquor from the still is separated from any salt which has deposited and neutralized by running it into a vat and stirring it with sufficient of the roasted zinc residues to neutralize any hydrochloric acid remaining. After separation from the excess of ore the liquor receives an addition of waste zinc clippings in excess of that required to precipitate the lead present. After 30 minutes the liquor is separated from the excess zinc and deposited lead and is treated with sodium chlorate sufficient to convert the ferrous chloride present into ferric chloride, whereupon zinc oxide free from lead is added in quantity as nearly as possible equivalent to the chlorine present in the form of ferric chloride and the mixture is boiled until the liquor is free from dissolved iron; if lead is found in the liquor it may again be precipitated by metallic zinc; if the liquor is found to contain sulphates, barium chloride equivalent to the sulphate-ion present may be added either before or after the precipitate produced by boiling has been separated, accordingly as it is more advantageous to avoid a separate filtration or to obtain a pure barium sulphate. The liquor next receives an addition of freshly precipitated barium carbonate equivalent to the quantity of zinc found by analysis to be present, and is boiled for 30 minutes. The zinc carbonate thus precipitated is substantially pure and may be calcined for producing good commercial zinc oxide. The liquor from which the zinc carbonate has been separated contains such of the chlorine-ions as was not removed by distillation (and that contained in the small quantity of sodium chlorate used) in the form of barium chloride; this chlorine is now recovered in the form of hydrochloric acid by adding an equivalent quantity of sulphric acid and separating the barium sulphate precipitated. The liquor is now adjusted in its concentration of salt and hydrochloric acid and is ready for re-use. The barium sulphate is converted again into barium carbonate in known manner.

My invention is also particularly applicable to the brine leaching of residues containing sulphate of lead, such as those arising after the leaching with sulphric acid of roasted zinc blende. I treat the lead chloride with sulphate of zinc according to my process described in the specification to British Patent application No. 6735 of 1924 to produce zinc chloride and sulphate of lead; the zinc chloride I treat with barium carbonate to produce zinc carbonate and barium chloride and the barium chloride I use for the removal of sulphates from the leaching liquor. In this manner I am able very efficiently to purify my liquors from sulphates and at the same time to obtain a zinc carbonate which by calcining yields a good oxide of zinc; the barium sulphate I may re-convert to barium carbonate using in connection with this process the carbonic acid evolved by heating the zinc carbonate.

I may also apply my invention to processes in which lead chloride is treated with iron in such a way as to form a chloride of iron and metallic lead. By means of a roasted zinc blende or zinc oxide, I convert the chloride of iron, after oxidation in known manner, into hydroxide of iron and zinc chloride. The zinc chloride I then convert by barium carbonate to barium chloride and zinc carbonate which, after calcining, I may use in another series of operations, the barium chloride I may employ in connection with the preparation of a further quantity of the lead chloride, the exact method of use depending upon the particular process by means of which the lead chloride has been prepared. The oxide of iron I may reduce again to the metal in known manner.

Similarly where lead chloride is treated with zinc for the recovery of metallic lead the zinc chloride may be converted by barium carbonate to zinc carbonate and barium chloride, the latter being employed in connection with the production of the lead chloride as previousy indicated.

In some applications of my process it may be advantageous to re-convert the barium chloride formed by the action of barium carbonate or zinc chloride into the carbonate by the use of ammonia and carbonic acid, thus forming a solution of ammonium chloride from which I recover the ammonia by distillation with lime, forming at the same time a solution of calcium chloride. This method may be particularly used where barytes is not locally available and where the expense of re-converting barium sulphate to barium carbonate is high on account of fuel costs, etc.

This invention is also applicable to the recovery of pure zinc oxide from ores, concentrates, residues or products, containing zinc oxide or metallic zinc, for instance from leady zinc oxides, from metallic residues containing zinc. I may treat such products with sulphuric acid to form a solution of zinc sulphate which I purify, if necessary, from iron by treatment with zinc oxide and purify from other substances in known manner. The zinc sulphate so formed I may convert into zinc chloride by treatment with lead chloride according to my process described in the specification to British patent application No. 6735 of 1924 to produce lead sulphate and zinc chloride. The zinc chloride I treat with barium carbonate to produce zinc carbonate and barium chloride. The lead sulphate I may reconvert to lead chloride by treatment with brine and/or by treatment with barium chloride so as to produce also barium sulphate which I may convert into barium carbonate in another cycle of operations. I may utilize my process as will be seen for the manufacture of barium chloride and/or precipitated barium sulphate.

Instead of producing my zinc chloride by first forming zinc sulphate and treating this with lead chloride, I may, of course, use hydrochloric acid to dissolve the zinc and regenerate this hydrochloric acid by treatment of the barium chloride with sulphuric acid.

It will be seen that by my process I am able to prepare from barytes and a material containing zinc or a zinc compound a pure carbonate of zinc and barium chloride or precipitated barium sulphate without the use of hydrochloric acid and even without the use of sulphuric acid.

For instance, I may take a product containing zinc sulphide and roast it so as to produce sulphate of zinc which I recover by leaching. Now by the use of chloride of lead I convert this into zinc chloride and lead sulphate. I convert the barium sulphate into barium carbonate and then treat the zinc chloride with the barium carbonate so as to produce zinc carbonate and barium chloride. The lead sulphate I treat, for instance, with brine to produce again sodium sulphate and lead chloride, the latter to use in another cycle of operations.

Having thus fully described the nature of my said invention and the best means I know of carrying the same into practical effect, I claim:—

1. In wet metallurgical processes of the kind described, wherein the material under treatment is leached with a leaching liquor containing chlorine-ions and wherein a solution containing zinc chloride is obtained, the step which consists in heating the said solution with freshly precipitated barium carbonate so as to obtain a solution of barium chloride and precipitated zinc carbonate.

2. In wet metallurgical processes for extracting values from ores or residues containing zinc wherein the material is leached with a leaching liquor containing chlorine-ions, wherein a solution containing zinc chloride is obtained, and wherein the said leaching liquor is repeatedly used, the combination of steps consisting in causing zinc chloride in the leaching liquor which has performed its leaching action to react with barium carbonate to produce zinc carbonate and barium chloride, and in treating leaching liquor which has performed its leaching action on another portion of the said material with barium chloride thus obtained so as to remove sulphate-ions as barium sulphate before causing the last-named liquor to react with barium carbonate as aforesaid.

3. In wet metallurgical processes for extracting values from ores or residues containing zinc wherein the material is leached with a leaching liquor containing chlorine-ions, wherein a solution containing zinc chloride is obtained, and wherein the said leaching liquor is repeatedly used, the combination of steps consisting in causing zinc chloride in the leaching liquor which has performed its leaching action to react with barium carbonate to produce zinc carbonate and barium chloride, and in treating leaching liquor which has performed its leaching action on another portion of the said material with some of the barium chloride thus obtained so as to remove sulphate-ions as barium sulphate before causing the last-named liquor to react with barium carbonate as aforesaid, and treating another portion of of the barium chloride with sulphuric acid so as to obtain barium sulphate and hydrochloric acid.

4. In a process of treating lead-zinc sulphide ores, concentrates or the like in which the ore is heated with an acid in presence of a solution of a chloride which causes the lead to pass into solution, the treatment of the liquor obtained by cooling it to cause a partial crystallization of lead salts, then separating the said lead salts, then separating the lead from the liquor by means of metallic zinc, then adding to the liquor barium chloride, so as to remove sulphate-ions in the form of barium sulphate, then heating the liquor with barium carbonate and then separating from the liquor the precipitated zinc carbonate thus formed.

5. In a process of treating lead-zinc sulphide ores, concentrates or the like in which the ore is heated with an acid in presence of a solution of a chloride which causes the lead to pass into solution, the treatment of the liquor obtained by cooling it to cause a partial crystallization of lead salts, then separating the said lead salts, then separating the lead from the liquor by means of metallic zinc, then adding to the liquor barium chloride, so as to remove sulphate-ions in the form of barium sulphate, then heating the liquor with barium carbonate, then separating from the liquor the precipitated zinc carbonate thus formed and treating the solution with sulphuric acid so as to precipitate barium sulphate and liberate hydrochloric acid.

6. In a process of treating lead-zinc sulphide ores, concentrates or the like in which the ore is heated with an acid in presence of a solution of a chloride which causes the lead to pass into solution, the treatment of the said solution in the following steps (1) cooling to cause a partial crystallization of lead salts and separation of these crystals, (2) neutralizing the liquor removed from the crystals, (3) adding metallic zinc to the neutralized liquor and, when the lead in the liquor has been precipitated, removing the excess of zinc and the lead from the liquor, (4) oxidizing any iron present, (5) boiling the liquor with zinc oxide free from lead to precipitate iron in the form of ferric oxide, and separating the precipitate thus formed, (6) removing the lead again by means of zinc if any has been introduced in the zinc oxide, (7) adding barium chloride to the liquor to precipitate the sulphates in the form of barium sulphate and separating the barium sulphate, (8) heating the liquor with a quantity of barium carbonate chemically equivalent to the zinc present and separating the zinc carbonate thus precipitated, (9) adding to the liquor sulphuric acid equivalent to the barium present and separating the barium sulphate from the solution of hydrochloric acid thus produced.

7. In the treatment of liquors containing iron chlorides for the recovery of hydrochloric acid, the combination of steps consisting in adding a zinc compound which will precipitate the iron and form zinc chloride, in subsequently adding barium carbonate so as to precipitate zinc carbonate and form barium chloride and in finally adding sulphuric acid to precipitate barium sulphate and produce hydrochloric acid.

8. A process of treating liquors containing zinc ions, chlorine ions and sulphate-ions which comprises precipitating the sulphate ions by addition of barium chloride, then precipitating zinc carbonate by heating the liquor with barium carbonate to precipitate zinc carbonate and obtain a solution containing barium chloride and using this barium chloride for precipitating sulphate-ions in a succeeding treatment of another batch of liquor.

In testimony whereof I have signed my name to this specification.

STANLEY COCHRAN SMITH. [L. S.]